(12) United States Patent
Lindgren et al.

(10) Patent No.: US 11,758,209 B2
(45) Date of Patent: *Sep. 12, 2023

(54) VIDEO DISTRIBUTION SYNCHRONIZATION

(71) Applicant: Amazon Technologies, Inc., Seattle, WA (US)

(72) Inventors: Per Lindgren, Strangnas (SE); Ted Olsson, Stockholm (SE); Anders Cedronius, Alvsjo (SE); Hans Insulander, Sollentuna (SE); Christer Bohm, Nacka (SE); Magnus Danielson, Stocksund (SE)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 128 days.

This patent is subject to a terminal disclaimer.

(21) Appl. No.: 17/381,535

(22) Filed: Jul. 21, 2021

(65) Prior Publication Data

US 2021/0352345 A1 Nov. 11, 2021

Related U.S. Application Data

(63) Continuation of application No. 16/797,952, filed on Feb. 21, 2020, now Pat. No. 11,095,929, which is a (Continued)

(30) Foreign Application Priority Data

Nov. 17, 2015 (SE) .................................. 1551487-0

(51) Int. Cl.
*H04N 21/242* (2011.01)
*H04L 29/06* (2006.01)
(Continued)

(52) U.S. Cl.
CPC ......... *H04N 21/242* (2013.01); *H04L 65/611* (2022.05); *H04L 65/65* (2022.05);
(Continued)

(58) Field of Classification Search
CPC ........... H04N 21/4302; H04N 21/8547; H04N 21/4305; H04N 21/242; H04N 21/43076;
(Continued)

(56) References Cited

U.S. PATENT DOCUMENTS 5,652,627 A  7/1997 Allen
6,259,677 B1 7/2001 Jain
(Continued)

FOREIGN PATENT DOCUMENTS

EP  1653747 A2  5/2006
EP  2670157 A2  12/2013
(Continued)

OTHER PUBLICATIONS

European Office Action dated Aug. 20, 2019; Application No. 16795325.6; pp. 6.
(Continued)

*Primary Examiner* — Brian D Nguyen
(74) *Attorney, Agent, or Firm* — Eversheds Sutherland (US) LLP

(57) ABSTRACT

Systems and methods for video distribution synchronization are described herein. An example method to distribute a media stream over a distribution network to a number of devices may include determining, by one or more computer processors coupled to memory, a common master-client shared time reference $T_{ref}$. Example methods may include determining a mean intermediate arrival time for first packets of a first type of the media stream, determining respective first playout times for the first packets based on the mean intermediate arrival time and the time reference $T_{ref}$ asso- (Continued)

ciating the first packets with the respective first playout times, and distributing the media stream to the plurality of devices.

15 Claims, 5 Drawing Sheets

Related U.S. Application Data continuation of application No. 15/776,900, filed as application No. PCT/EP2016/077604 on Nov. 14, 2016, now Pat. No. 10,609,431.

(51) Int. Cl.
| | |
|---|---|
| *H04N 21/236* | (2011.01) |
| *H04N 21/43* | (2011.01) |
| *H04N 21/8547* | (2011.01) |
| *H04L 65/65* | (2022.01) |
| *H04L 65/611* | (2022.01) |
| *H04N 21/61* | (2011.01) |

(52) U.S. Cl.
CPC ... *H04N 21/23605* (2013.01); *H04N 21/4302* (2013.01); *H04N 21/4305* (2013.01); *H04N 21/43076* (2020.08); *H04N 21/8547* (2013.01); *H04N 21/6125* (2013.01)

(58) Field of Classification Search
CPC .......... H04N 21/23605; H04N 21/6125; H04L 65/611; H04L 65/65
See application file for complete search history.

(56) References Cited

U.S. PATENT DOCUMENTS

| | | | |
|---|---|---|---|
| 7,673,321 | B2 | 3/2010 | Yurt et al. |
| 7,730,512 | B2 | 6/2010 | Yurt et al. |
| 10,136,034 | B2 | 11/2018 | Back et al. |
| 10,609,431 | B2 | 3/2020 | Lindgren et al. |
| 2003/0169776 | A1 | 9/2003 | Reesor |
| 2004/0128701 | A1 | 7/2004 | Kaneko et al. |
| 2006/0013263 | A1 | 1/2006 | Fellman |
| 2007/0280227 | A1 | 12/2007 | Suzuki et al. |
| 2008/0259966 | A1 | 10/2008 | Baird et al. |
| 2013/0163618 | A1 | 6/2013 | Sergeev et al. |
| 2014/0195651 | A1 | 7/2014 | Stockhammer et al. |
| 2014/0280325 | A1 | 9/2014 | Krishnamurthy et al. |
| 2014/0359075 | A1 | 12/2014 | Amidei et al. |
| 2015/0052571 | A1 | 2/2015 | Stokking et al. |
| 2015/0179227 | A1* | 6/2015 | Russell .............. H04N 21/4348 386/354 |
| 2015/0256613 | A1* | 9/2015 | Walker ................. H04L 43/10 709/217 |
| 2016/0217829 | A1* | 7/2016 | Bloch ................ H04N 21/4305 |
| 2016/0269771 | A1* | 9/2016 | Bangma ............ H04N 21/4126 |
| 2017/0034059 | A1* | 2/2017 | Annamraju ......... H04L 43/0852 |
| 2018/0020416 | A1 | 1/2018 | Smith et al. |
| 2018/0035019 | A1 | 2/2018 | Back et al. |
| 2018/0124731 | A1 | 5/2018 | Klotchkov et al. |
| 2018/0227231 | A1* | 8/2018 | Ravuri .................. H04L 65/80 |
| 2018/0227349 | A1* | 8/2018 | Annamraju ......... H04L 43/0858 |
| 2019/0090028 | A1 | 3/2019 | Kirley |
| 2020/0092024 | A1 | 3/2020 | Williams et al. |
| 2020/0143834 | A1 | 5/2020 | Yahata |
| 2020/0266839 | A1 | 8/2020 | Mani et al. |

FOREIGN PATENT DOCUMENTS

| | | | |
|---|---|---|---|
| EP | 2670157 | A3 | 5/2014 |
| WO | 2008138047 | A1 | 12/2008 |
| WO | 2012021747 | A1 | 2/2012 |
| WO | 2013004286 | A1 | 1/2013 |
| WO | 2013144347 | A1 | 10/2013 |

OTHER PUBLICATIONS

International Search Report and Written Opinion for PCT/EP2016077604 dated Feb. 27, 2017; pp. 17.
Swedish Office Action for Application No. 1551487-0 dated Jul. 1, 2016; pp. 6.
IPI, "Office Action", App. No. 201817013497, dated Mar. 13, 2020; pp. 7.
EPO, "Summons" App. No. 16795325.6, dated Jan. 20, 2021, pp. 6.
EPO, "Extended European Search Report" Application No. 22161709.5 dated Jun. 21, 2022; 13 pages.

* cited by examiner

VIDEO DISTRIBUTION SYNCHRONIZATION

CROSS-REFERENCE TO RELATED APPLICATIONS

This application is a continuation of U.S. application Ser. No. 16/797,952, filed Feb. 21, 2020 and issued as U.S. Pat. No. 11,095,929, which is a continuation of U.S. application Ser. No. 15/776,900, filed May 17, 2018 and issued as U.S. Pat. No. 10,609,431, which is a national phase application under 35 U.S.C. § 120 to PCT International Application No. PCT/EP2016/077604, having an international filing date of Nov. 14, 2016, which claims priority to Swedish Patent Application No. 1551487-0, filed Nov. 17, 2015, the entire contents of each of which are hereby incorporated by reference.

FIELD OF THE INVENTION

The present invention relates generally to the field of data transmission, and more particularly to synchronized playout at multiple client devices in data packet based networks providing real-time multimedia communication.

BACKGROUND OF THE INVENTION

Streaming digital media content like video or audio in compressed form over IP networks, e.g., the Internet, is for the viewer perceived as an instant downloading during playback of the content. In a live distribution, the video signal is converted into a compressed digital signal and transmitted from a master server as unicast or multicast, simultaneously sending a single file to multiple user client devices.

One of the most common ways to distribute video over the Internet is to use HLS (HTTP Live Streaming) where the video stream is chucked into 10-second video files so the video will consist of a series of these 10-second video files. The client device then requests these files using normal HTTP and to ensure that the client device always has video data to present, it ensures that it has at least 3 of these files buffered in the device. This means that this buffering will impose at least 30 seconds of delay. In addition, a content player downloads and stores data in the receiving device to compensate for network problems such as packet loss and jitter. At startup the buffer is filled up to a certain level, typically 30 seconds. If packets are lost, the transport protocol TCP requests the data again and also reduces the bitrate on outgoing traffic to avoid congestion. Since this process takes time and the more errors the slower, the buffer needs to increase with the result of a larger delay. This means that the delay will increase over time. Another consequence is that since the different devices experience different packet loss and jitter, the buffer fill level will be different on the different client devices meaning that their presentation of the video will be delayed and out of sync.

For online streaming over the Internet, primarily to mobile devices, tablets or Internet-connected TV sets, the variance in delay of the transport of the media content to different viewers watching (or listening) on different devices can vary significantly. This has the effect that e.g., a live TV channel or a live sports event can be viewed with seconds and, in the case of current Over-The-Top (OTT) delivery, even several minutes difference. This can ruin the experience for the one with the longest delay, if people are sitting close to each other like in a bar or train watching the same content, or if they are in parallel to the viewing having a social conversation such as phone, Facebook, Twitter, SMS or chat. Further, the absolute delay throughout the distribution is, of course, in itself a problem in real-time multimedia communication. The actual transport delay over the Internet from source to different receiving client devices can vary between typically a few to several hundred milliseconds depending on type of underlying network infrastructure, last-mile technology, and network congestion.

Typically, TV/video over the Internet also involves the use of Adaptive Bit Rate (ABR), meaning that the same program is sent in different versions with different qualities/bitrates, and additional buffering is needed to handle the switching between different Bit Rates in a seamless manner.

A commonly used protocol for synchronizing the playout of media content files is a Transport Protocol for Real-Time Applications (RTP), in the following referred to as RTP. RTP includes a control protocol RTCP that provides synchronization information including timestamps and control packets from the master server and feedback information from the client device. When RTP media data packets are sent, the timestamps in the media data packets describe the moment in time the packet was created in time units of the sample clock. The main intention of RTP is to provide re-synchronizing of video and audio content received in a client device as separate streams. RTP/RTCP does not sync between different devices since the timestamps do not have relation to the global clock such as UTC.

A prior art document, WO 2012/021747, discloses a method comprising transmitting a playback session identifier to a content server. The playback session identifier is associated with a unique playback session for a digital content title, receiving a server-side event that includes a playback command and a specified time for executing the playback command, and scheduling the playback command for execution at the specified time based on a local time signal that has been synchronized to a time reference signal generated by a remote time server. While the document sets forth a method for playing a digital content title with different individual viewing preferences synchronously, across multiple endpoint devices, the disclosed method is suitable for video-on-demand services and not to broadcasting/real-time TV-distribution/in real-time.

SUMMARY OF THE INVENTION

It would be advantageous to obtain perceived synchronization of media streams by providing a method that allows media streams, such as TV/video/audio streams, distributed over a best-effort IP network to be displayed simultaneously at multiple client devices, and which method is applicable for packet-based distribution in best-effort systems.

This object is achieved by a method in a distribution network comprising a central master node for distributing a received media stream comprising at least a first type of packets over the distribution network to a multiple of client devices. The method comprises providing a common master-client shared time reference $T_{ref}$ and at the central master node: determining a mean intermediate arrival time for received packets of the first type, determining respective first playout time information for the packets of the first type based on the mean intermediate arrival time and the time reference $T_{ref}$, timestamping the packets of the first type with the respective first playout time information, and distributing the media stream to the multiple of client devices. Thereby a synchronized playout of the media stream is enabled at the multiple client devices which handles the unpredictable arrival time of packet-based distribution of media streams through a network. By providing playout time information at the central master node, an exact time to display the TV/video/audio stream can be indicated to all client devices. According to embodiments of the inventive concept, an exact playout time to be distributed to all client devices is provided at the master server, or alternatively extracted from the playout time information and generated in the client device, to ensure a precise and synchronized playout of the stream at the client devices. The present inventive concept is adapted to handle encoded video or media stream arriving asynchronously (using IP/Ethernet networks) to the ingress, having different video packet sizes and different delays through the distribution network. Before further distribution of the media stream to the client devices, timestamping containing a playout time information based on reconstructed frequency data is therefore performed. The arrival frequency gives the sequence of presentation times.

A time delay delta is according to an embodiment of the method added to cope with the worst time delay from ingress to the device including transport delay, retransmission delay, processing and buffering. As mentioned above, in e.g., encoded video streams, each frame may have different sizes (e.g., full picture or delta of a picture) meaning that the transmission time will differ and they will arrive at different times. By measuring intermediate arrival times of e.g., full pictures, and knowing the number of delta pictures between full pictures that is being sent a mean frequency of full pictures arriving. By combining the provided mean frequency with a client-server shared time reference, e.g., UTC time, playout time information for each frame is provided, which is timestamped into the packet for the receiving client to extract. The process of determining a new full picture frequency and restamping is provided for each selected channel of a media distribution service, meaning that in the case of channel zapping, the process of recovering a picture frequency is reinitiated.

According to an embodiment of the method, when the received media stream further comprises packets of a second type, the timestamping with a respective second playout time is provided based on a predetermined ratio between the number of packets of the first type and the number of packets of the second type, which is advantageous. The ratio between the full and the delta pictures in the encoded video stream is defined by the Group of Picture (GOP), e.g., MPEG-4 GOP or HEVC GOP, and is set at the encoder and is after configuration fixed.

According to an embodiment of the method, the first type of packet is associated with full picture video data, and the second type is associated with delta picture video data, which is advantageous as the encoded video stream may then be used directly without processing or to avoid that timestamping is performed prior to encoding of primary distribution to the ingress.

According to an embodiment of the method, the time reference $T_{ref}$ is based on Coordinated Universal Time, UTC, Network Time Protocol, NTP, or is derived from a mobile network, set manually, or from GPS. All these options are applicable with the inventive concept if the time reference is reliable. NTP, for instance, has some challenges to distribute a sufficiently reliable time to client devices, as NTP traffic can be blocked by firewalls, NTP traffic can be lost making clock recovery and thus time accuracy insufficient for keeping the videos between the devices synchronized, the NTP traffic imposes overhead which increases the capacity use which can take bandwidth from the video transport, since NTP consumes extra capacity, the frequency of NTP packets needs to be low which results in low accuracy of the clock and thereby the time of presentation not correct.

According to an embodiment of the method, it further comprises inserting timestamps of the reference time into the media stream and into a back reporting stream of each client device, and extracting the timestamps of the reference time in the multiple client devices for providing a coordinated local time of said multiple client devices. The method may further comprise the steps of adding the back reporting stream time difference and estimating, round-trip time based on measured differences, and then compensate the timescale for estimated one-way delay. This provides an improved and advantageous manner of distributing a server-client shared time reference in the system. By adding time information in the actual video packets instead of sending, e.g., NTP packets, timing packets being blocked by firewalls, which is a common problem, is avoided. Further, the frequency of the time information will be much higher and at zero or very low overhead. The accuracy of the local clock in the respective client devices is thus increased and synchronized playout of the media stream at different client devices is improved. The lower overhead, higher frequency of timestamps, and inband also means that the time synchronization information is not blocked by a network firewall as can be the case when using a separate protocol such as NTP.

According to an embodiment of the method, the first or second playout time comprises a playout delay, which may be predetermined or set by the central master node. The delay A is according to an embodiment of the invention selected to correspond to at least a maximum transport delay of the media stream to a client device through the distribution network. Since the distribution path, traffic conditions, etc. in the distribution network will differ for different client devices, the playout delay is selected large enough to handle the longest transport delay and, according to an embodiment, also for allowing for enough time for retransmission or other packet recovery and stream handling. The delay may further comprise a buffer time for retransmission and/or other packet recovery and media stream handling through the network, which in turn facilitates for synchronization between client devices.

According to an embodiment of the method, it further comprises inserting the playout delay into the media stream, which is advantageous for optionally providing new delay data to the client devices, e.g., when there is a need to handle worst-case delay without running empty of data to present at the client device or when a client device is synchronized with a client device which receives content from a different playout server.

According to an aspect of the invention, there is provided a client-side method in a distribution network, comprising a central master node for distributing a media stream over the distribution network to a multiple of client devices, which method comprises receiving a common master-client shared time reference, receiving the media stream, and determining based on time information extracted from the media stream a respective first playout time of each packet of a first type of the received media stream. The respective first playout time is based on a mean intermediate time arrival of the media stream at the central master node, and playing each packet of the first type at the respective playout time, thereby providing synchronized playout of the media stream with respect to the multiple client devices. This is advantageous as, in this case, there is no need to decode and encode in the master node where the playout time is inserted.

According to an embodiment of the method, when the received media stream further comprises packets of a second type, the method further comprises determining, based on time information extracted from the media stream and based on a predetermined ratio between the number of packets of said first type and the number of packets of said second type, a respective second playout time of each packet of the second type of the received media stream.

According to an embodiment of the method, it further comprises extracting timestamps of said reference time from the media stream to provide a local time reference, which is advantageous as e.g. time protocols like NTP experience problems with firewalls. Further, this may increase frequency and accuracy of the timing, and the overhead in the network is decreased as compared to using other time protocols.

According to an aspect of the invention, there is provided a node in a distribution network comprising means for performing a method according to the present inventive concept.

According to an aspect of the invention, there is provided a software module adapted to perform the method according to the present inventive concept, when executed by a computer processor, which advantageously provides a simple implementation and scalability of the solution.

According to an embodiment of the method, the adding of time information, e.g., with timestamps of the reference time, to coordinate the time between the client devices in the data packets is combined with the normal client device timing mechanisms, such as NTP, UTC, etc., which further ensures exact time to offer redundant ways of distributing time in the system.

Embodiments of the present inventive method are preferably implemented in a distribution, media content provider, or communication system by means of software modules for signaling and providing data transport in form of software, a Field-Programmable Gate Array (FPGA), an Application Specific Integrated Circuit (ASIC) or other suitable device or programmable unit, adapted to perform the method of the present invention, an implementation in a cloud service or virtualized machine (not shown in diagrams). The software module and/or data-transport module may be integrated in a node comprising suitable processing means and memory means, or may be implemented in an external device comprising suitable processing means and memory means, and which is arranged for interconnection with an existing node.

Further objectives of, features of, and advantages with, the present invention will become apparent when studying the following detailed disclosure, the drawings, and the appended claims. Those skilled in the art realize that different features of the present invention can be combined to create embodiments other than those described in the following.

BRIEF DESCRIPTION OF THE DRAWINGS

The above, as well as additional objects, features, and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
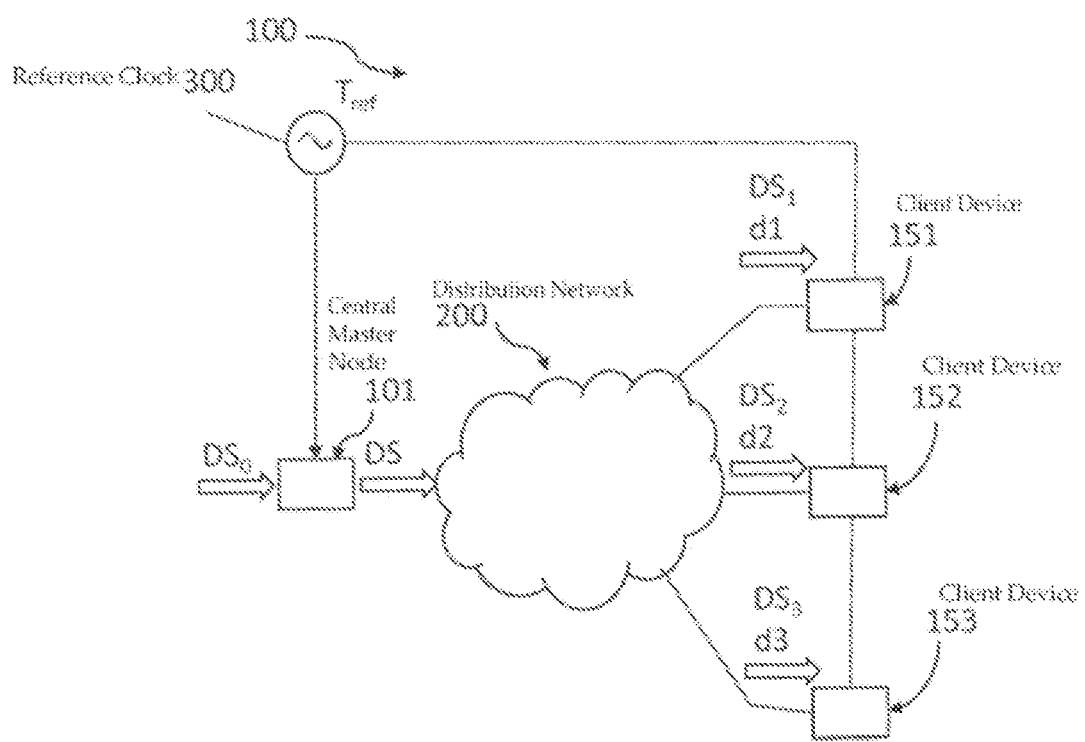
FIGS. 1 and 2 are schematic block diagrams illustrating embodiments of a server-client media content provider system according to the present inventive concept.

FIG. 1 is a block diagram schematically illustrating a media content provider system 100, hereinafter referred to as system 100, comprising a central master node 101, a distribution network 200 in which the central master node is located, and a plurality of client devices 151, 152, and 153. The distribution network 200 typically includes several intermediate nodes and instances. The central master node 101 may be implemented in a cloud service and is then logic, and may also be referred to as an ingest node, ingress node, or central playout. The system 100 is configured to implement one or more aspects of the present invention and is arranged to be operative for providing streamed media content to the client devices 151, 152, and 153, via the distribution network 200. In the exemplifying embodiments described herein, the distribution network 200 comprises a switching and routing network based on the industry standard internet protocol (IP) and may be embodied by e.g., the Internet. The master node 101 may be located at any content provider or service provider in a multiple service provider system. The client devices 151-153, and the master node are here all connected to a reference clock 300, here a Global clock (UTC). In alternative embodiments providing a time reference, $T_{ref}$ of the master node and/or the client devices is based on Coordinated Universal Time, Network Time Protocol, NTP, or is derived from a mobile network, set manually, or from GPS. A media stream $DS_0$ is received and processed at the central master node 101, and subsequently sent using broadcasted, multicast or unicast as a processed media stream DS via the distribution network 200. The client devices 151, 152, 153 receives a respective media stream DS1, DS2, and DS3, which each have been delayed a transport delay d1, d2, and d3 through the distribution network 200.

Each client device 151, 152, 153, may be implemented as a smartphone, a tablet, a connected TV, a computer, etc., and may further comprise a respective media content player (not shown). The media content player may alternatively be a media player for execution by a plug-in for playing streamed media content when accessing the system 100 in FIG. 1, or some other media streaming system coupled via the Internet.

Figure 2:
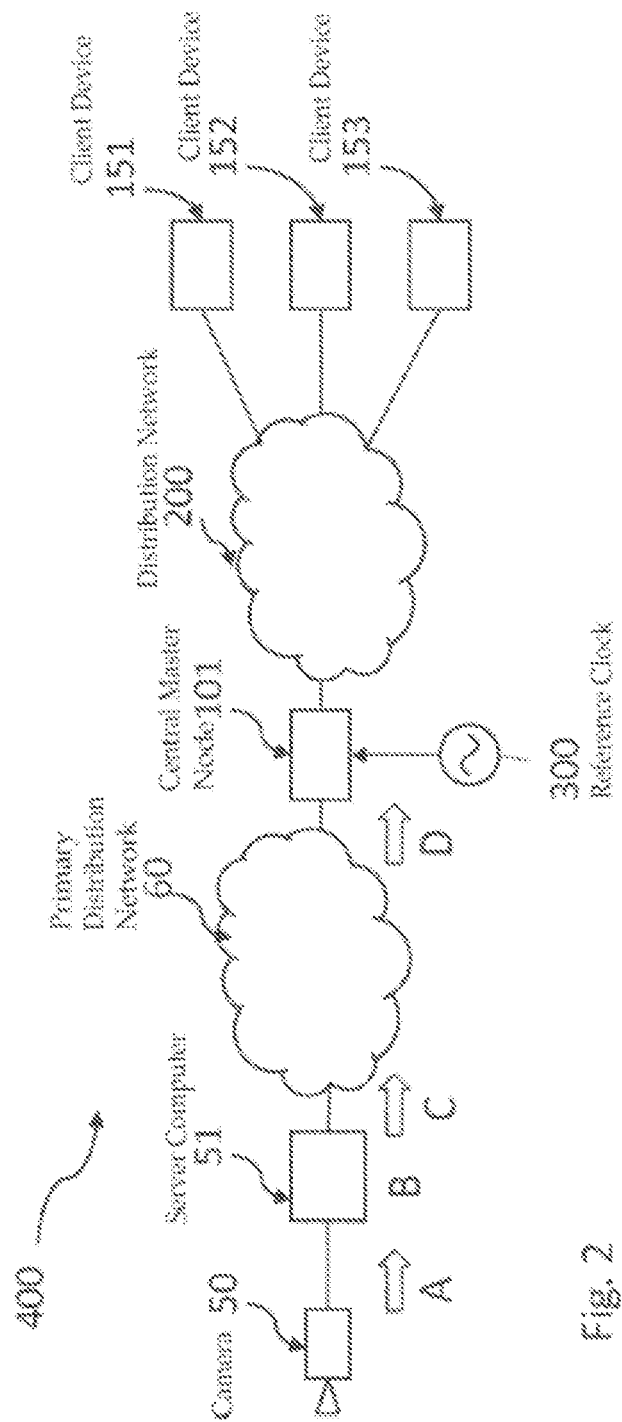
Figure 3:
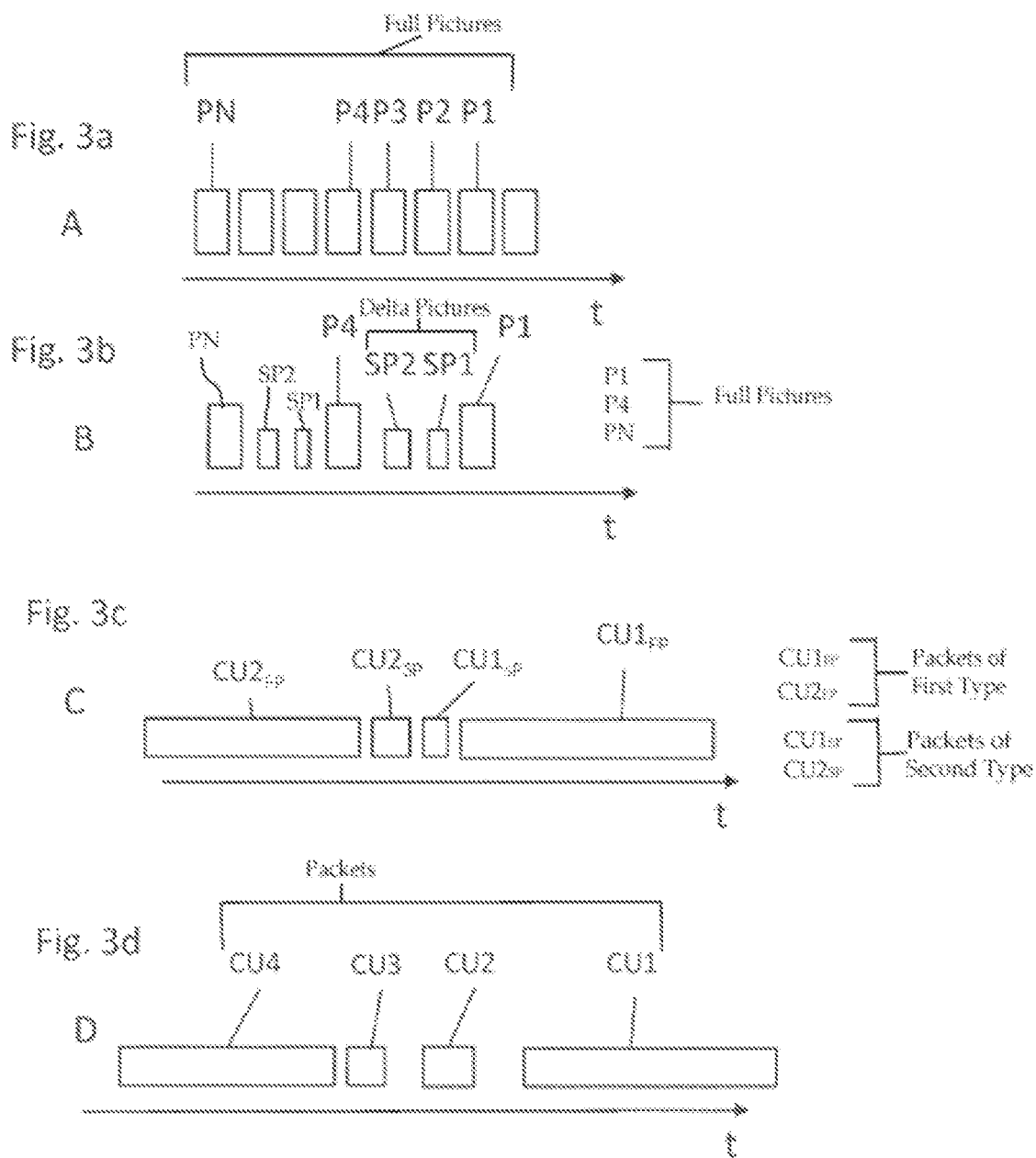
FIGS. 3a-3d are schematic illustrations of a media stream at different stages in a media content provider system.

Referring now to FIG. 2, which is a block diagram schematically illustrating the system 100 connected to a network system 400 of IP type for live distribution of video, in view of which an aspect of the inventive concept will be described. At an ingress point at a broadcast location (TV network, local TV studio, cable system, event location such as sports stadium, etc.) a camera 50, producing a live media stream A comprising media content, here exemplified by full pictures P1, P2, . . . PN, see, FIG. 3a, is connected to a server computer 51. The server computer 51, which may also be a dedicated device implemented with FGPA, ASIC, etc., is arranged to encode media stream A, typically compressing the data which here is represented as full pictures P1, P4 and delta pictures SP1, and SP2, which represents the specific change of a full picture at a specific time instance. The encoded media stream indicated as B in FIG. 2, and FIG. 3b. The encoded media content is then typically sent as a packet stream C, using unicast or multicast, comprising a stream of packets CU carrying the encoded data. Each packet CU will typically have a different size, but the packets may also represent different types of packets with some header or trailer portion identifying the type. In the exemplifying embodiment, basically, two types of packets are represented, a first type representing full pictures $CU1_{FP}$, $CU2_{FP}$, and a second type representing delta pictures $CU1_{SP}$, $CU2_{SP}$, in FIG. 3c. Other types of packets are applicable, e.g., audio packets. In an alternative embodiment, pre-recorded media streams (programs) for distribution to the client devices are provided from a storage medium. The packet stream C is distributed via a primary distribution network 60, which does not need to be a dedicated network but can be shared with other services, to a playout server, here embodied by the central master node 101, from which the multiple client devices 151, 152, 153 located at different viewer locations requests media content to display. Each client device 151-153 comprises means for processing received media content and to select media content to play.

The media stream C is transported from the broadcast location in a stream where different sizes of the full and partial frames will incur that the start of the frames will no longer be evenly spaced. Through the primary network 60, due to different transport paths, network congestion, improper queuing, configuration errors, etc., the packets of the media stream are subjected to various packet transfer delay and jitter. Throughput and performance of the network may vary, affected by various parameters of the real-time network environment, e.g., traffic density. The transported media stream D arrives at the central master node 101 with even more variation in delays between the packets, than when entering the network 60 as a stream C, which is schematically illustrated in FIG. 3d. The original picture frequency now needs to be recreated and transformed to a sequence of playout times.

Figure 4:
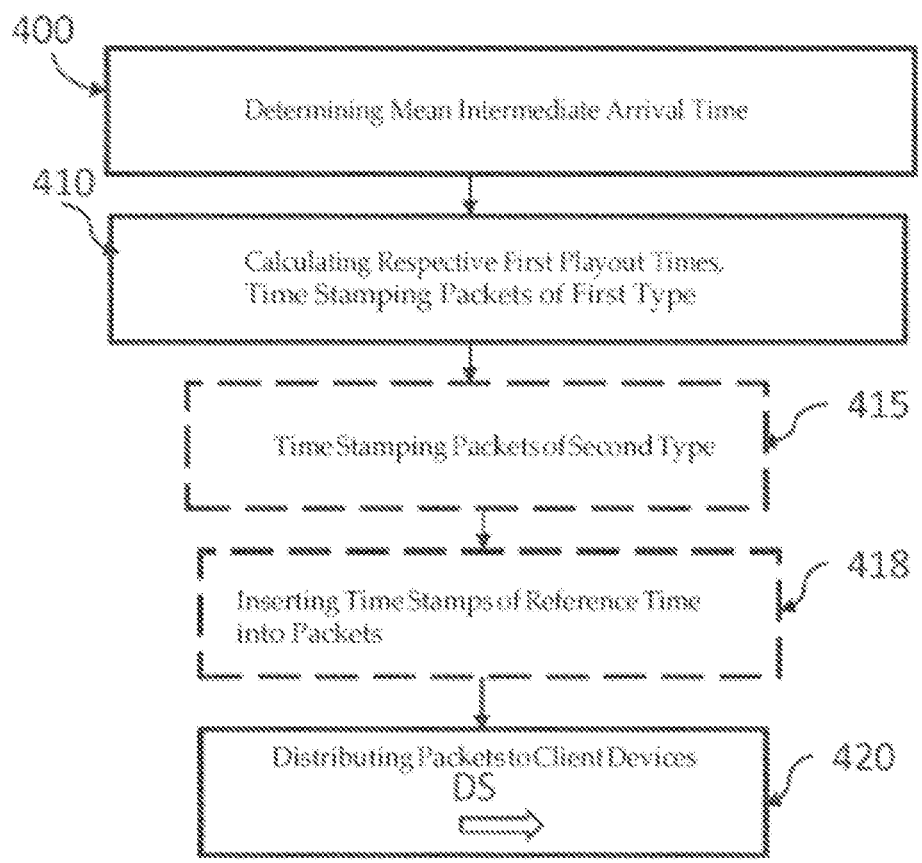
FIG. 4 is a flowchart of data transmission operations according to embodiments of a method according to the present inventive concept.

Considering now, with reference again to FIG. 1, that the transported media stream D as described in FIG. 3d is the received media stream $DS_0$. To provide synchronization of replay of the media content at the client devices which the central master node 101 serves, according to the present inventive concept, the central master node 101 comprises processing means (not shown) configured for performing steps of embodiments of the method according to the present inventive concept. Continuing now with reference to FIG. 1 and to FIG. 4. The received media stream $DS_0$ is processed by first determining a mean intermediate arrival time for received packets of the first type, here represented by full pictures (step 400). This process may be continuously performed or performed within predetermined time intervals.

For each packet of the first type, a respective first playout time is calculated based on the determined mean intermediate arrival time and the common master-client shared time reference 300 (step 410). In a subsequent step (step 410) each packet of the first type is timestamped with its respective first playout time and then distributed to the multiple of client devices 151, 152, 153 (step 420).

According to an embodiment of the method, e.g., when looking at an exemplifying embodiment as described herein, when the received media stream $DS_0$ further comprises packets of a second type, here delta pictures, timestamping of the packets of the second type is performed in a step (step 415) with a respective second playout time. The second playout time may be based on a predetermined ratio between the number of packets of the first type (full pictures) and the number of packets of the second type (delta pictures), e.g., by utilizing GOP data. With the already determined first playout times, a preset interval between them, and the number of second packets between each packet of the first type, the respective second playout time for each packet of the second type can be determined and inserted before distribution to the client devices.

Packets of the first or second type as described herein may refer to content units, like, for instance, full pictures, delta pictures, or audio sequences, which content units depending on size may be transported and divided into multiple packets. Each content unit, i.e., full picture, etc., is however preferably timestamped only once with playout time information.

According to an embodiment of the inventive concept, the playout time information, TS is selected to comprise a common playout delay $\Delta$. Thus, the timestamps TS are set to be TS=UTC+$\Delta$. The playout delay $\Delta$ is here selected to be a 3-second delay, which is sufficient to cover a maximum delay of the transport from the ingress node, master node 101, to any one of the client devices, 151, 152, 153. Three respective instances DS1, DS2, and DS3 of the timestamped media stream are distributed over the distribution network and are, depending on the transport delay through the distribution network 200, received at the respective display device, 151, 152, 153, at different times, say UTC+1, UTC+3, UTC+2. When the video packet with the timestamp UTC+3 arrives at a time before the predetermined playout time UTC+3, the client device waits until the predetermined playout time UTC+3 is reached before playing the corresponding video content. This means that all client devices will present the content of the video packets synchronized, at the same time, as long as the playout delay is selected to correspond to at least the maximum transport delay of the media stream through the distribution network.

According to European Broadcasting Union (EBU), which defines TV standards in Europe, live TV is defined as broadcasting with a delay from the ingress to the client device playout which is lower than a so called seven-second delay. "Real" live distribution of video/TV over the internet is thus provided by means of the invention (from the guy kicking the ball to it is seen on the TV, i.e., including all delays).

Figure 5:
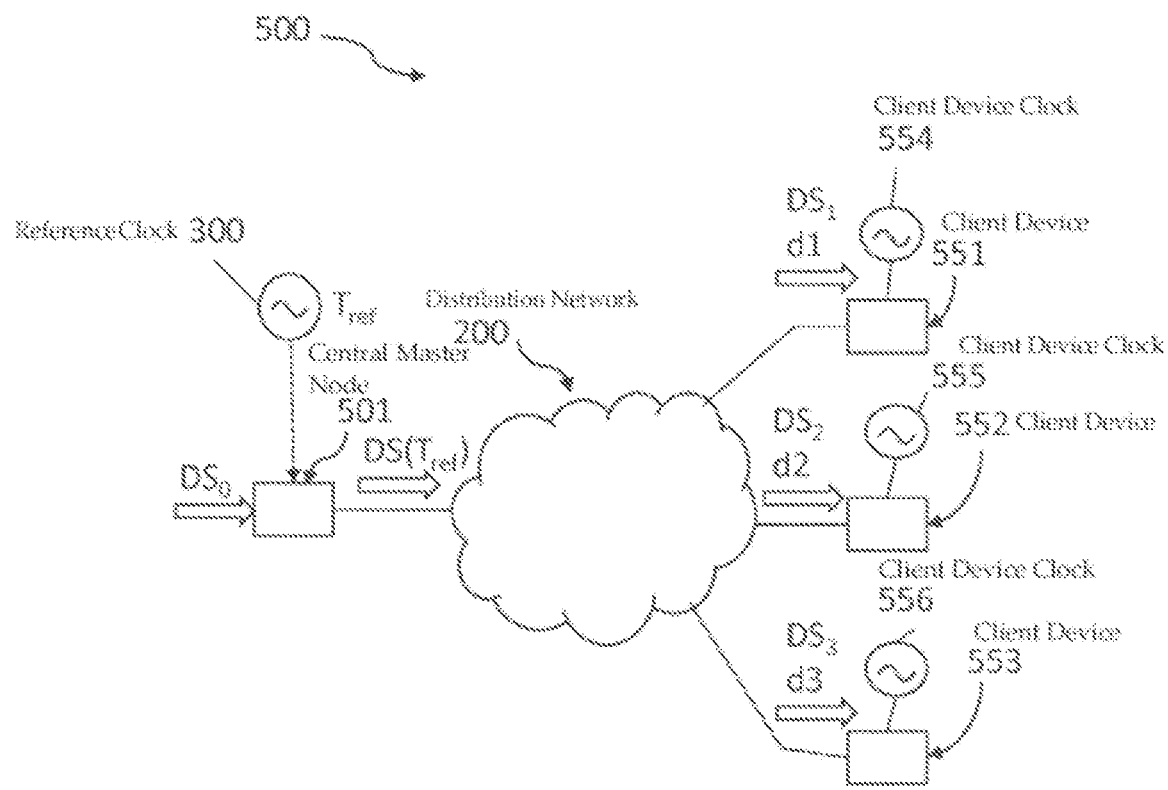
FIG. 5 is a schematic block diagram illustrating a server-client media content provider system according to an embodiment of the present invention. All the figures are schematic, not necessarily to scale, and generally only show parts which are necessary in order to elucidate the invention, wherein other parts may be omitted or merely suggested.

According to an embodiment of the invention, with reference now to FIG. 5, which is a block diagram schematically illustrating a media content provider system 500, hereinafter referred to as system 500, comprising a central master node 501, a distribution network 200 in which the central master node is located, and a plurality of client devices 551, 552, and 553. The master node is provided with a reference time $T_{ref}$ from a reference source 300 being provided by, e.g., UTC, the master node processing means is further configured for inserting timestamps of the reference time $T_{ref}$ into the packets of the media stream DS (step 418, in FIG. 4). As the media stream is received in the client devices 551, 552, 553, these timestamps of the reference time $T_{ref}$ are extracted and utilized for providing a coordinated local time between the multiple client devices clocks 554, 555, 556. According to an embodiment of the inventive concept, a client-side method in a distribution network 200 comprising a central master node 501 for distributing a media stream over the distribution network 200 to a multiple of client devices 551, 552, 553, the method comprises the step of receiving a common master-client shared time reference $T_{ref}$, where the time reference is optionally provided in the media stream by extracting timestamps of the reference time $T_{ref}$ from said media stream to provide a local time reference. The time information is pre-inserted in the packets of the media stream at a central master node 501, as illustrated schematically in FIG. 5. At the client time information is extracted from the received packets, and a playout time associated with each packet is determined based on the extracted time information. The time information comprises a mean intermediate time arrival of the media stream at the central master node and/or a playout time determined by the central master node. The client device is arranged for playing the packet at the respective playout time, thereby providing synchronized playout of the media stream at multiple client devices. In the case when the received media stream comprises packets of a first type and packets of a second type, the method further comprises determining based on time information extracted from the media stream, a respective second playout time of each packet of the second type of the received media stream. The second playout times may be determined based on a known ratio between the number of packets of the first and second types as previously described.

The invention claimed is:

1. A method to receive a media stream over a distribution network from a central node connected to a plurality of devices, the method comprising:
   receiving, by a device of the plurality of devices, first packets of a first type of the media stream, wherein the media stream further comprises second packets of a second type;
   determining respective first playout times for the first packets, wherein the respective first playout times are based on a mean intermediate arrival time for the first packets and a time reference $T_{ref}$;
   receiving timestamps for the first packets corresponding to the respective first playout times;
   receiving timestamps for the second packets corresponding to respective second playout times based on a predetermined ratio between a first number of the first packets and a second number of the second packets; and
   causing the media stream to be rendered.

2. The method of claim 1, wherein the time reference $T_{ref}$ is a common master-client shared time reference $T_{ref}$.

3. The method of claim 1, wherein the respective first playout times are associated with the first packets.

4. The method of claim 1, wherein the first type is associated with full picture video data, and the second type is associated with delta picture video data.

5. The method of claim 1, further comprising:
   the central node, wherein the central node is configured to associate the first packets with the respective first playout times.

6. The method of claim 1, further comprising:
   receiving timestamps of the time reference $T_{ref}$ in the media stream and in a back reporting stream; and
   extracting the timestamps of the time reference $T_{ref}$ for providing a coordinated local time of device.

7. The method of claim 1, wherein each respective first playout time includes a predetermined playout delay.

8. A device configured to receive a media stream over a distribution network from a central node connected to a plurality of devices, the device comprising:
   memory configured to store computer-executable instructions; and
   at least one computer processor configured to access the memory and execute the computer-executable instructions to:
      receive first packets of a first type of the media stream, wherein the media stream further comprises second packets of a second type;
      determine respective first playout times for the first packets, wherein the respective first playout times are based on a mean intermediate arrival time for the first packets and a time reference $T_{ref}$;
      receive timestamps for the first packets corresponding to the respective first playout times;
      receive timestamps for the second packets corresponding to respective second playout times based on a predetermined ratio between a first number of the first packets and a second number of the second packets; and
      cause the media stream to be presented.

9. The device of claim 8, wherein the time reference $T_{ref}$ is a common master-client shared time reference $T_{ref}$.

10. The device of claim 8, wherein the respective first playout times are associated with the first packets.

11. The device of claim 8, wherein the first type is associated with full picture video data, and the second type is associated with delta picture video data.

12. The device of claim 8, wherein the at least one processor is further configured to access the memory and execute the computer-executable instructions to:
    receive timestamps of the time reference $T_{ref}$ in the media stream and in a back reporting stream; and
    extract the timestamps of the time reference $T_{ref}$ for providing a coordinated local time of device.

13. The device of claim 8, wherein each respective first playout time includes a predetermined playout delay.

14. A system comprising:
    a central node configured to distribute a media stream to a plurality of devices; and
    a device of the plurality of devices, the device configured to:
       receive first packets of a first type of the media stream, wherein the media stream further comprises second packets of a second type;
       determine respective first playout times for the first packets, wherein the respective first playout times are based on a mean intermediate arrival time for the first packets and a time reference $T_{ref}$;
       receive timestamps for the first packets corresponding to the respective first playout times; and
       receive timestamps for the second packets corresponding to respective second playout times based on a predetermined ratio between a first number of the first packets and a second number of the second packets; and
       cause the media stream to be presented.

15. The system of claim 14, wherein the time reference $T_{ref}$ is a common master-client shared time reference $T_{ref}$, and wherein the respective first playout times are associated with the first packets.

* * * * *